(12) United States Patent
Lee et al.

(10) Patent No.: US 7,493,213 B2
(45) Date of Patent: Feb. 17, 2009

(54) SINGLE OR MULTIPLE ROUTE MAP MATCHING APPARATUS FOR NAVIGATION SERVICE AND METHOD THEREOF

(75) Inventors: Eun-Hee Lee, Kwangmyong (KR); Kyong-Joon Chun, Seoul (KR); Young-Khon Moon, Suwon (KR)

(73) Assignee: Samsung Electronics Co., Ltd (KR)

( * ) Notice: Subject to any disclaimer, the term of this patent is extended or adjusted under 35 U.S.C. 154(b) by 602 days.

(21) Appl. No.: 10/371,062

(22) Filed: Feb. 20, 2003

(65) Prior Publication Data

US 2003/0163253 A1 Aug. 28, 2003

(30) Foreign Application Priority Data

Feb. 27, 2002 (KR) ................. 2002-10692

(51) Int. Cl.
*G01C 21/34* (2006.01)
(52) U.S. Cl. ................. 701/209; 340/995.22; 348/211.3
(58) Field of Classification Search ................. 701/209, 701/200, 117, 24, 25, 210, 208, 202, 212, 701/213, 211, 207; 340/990, 905, 988, 995, 340/995.17, 995.19, 995.22; 455/456, 456.1, 455/457, 557, 411; 707/2; 370/316, 250, 370/349, 401; 348/211.3; *G01C 21/34*
See application file for complete search history.

(56) References Cited

U.S. PATENT DOCUMENTS

| 5,523,765 | A | * | 6/1996 | Ichikawa | 342/451 |
| 5,610,821 | A | * | 3/1997 | Gazis et al. | 455/456.5 |
| 5,712,632 | A | * | 1/1998 | Nishimura et al. | 340/995.19 |
| 6,061,628 | A | * | 5/2000 | Hayashi et al. | 701/208 |
| 6,073,075 | A | * | 6/2000 | Kondou et al. | 701/203 |
| 6,094,618 | A | * | 7/2000 | Harada | 701/207 |
| 6,115,611 | A | * | 9/2000 | Kimoto et al. | 455/456.3 |
| 6,178,505 | B1 | * | 1/2001 | Schneider et al. | 713/168 |

(Continued)

FOREIGN PATENT DOCUMENTS

EP 1 118 837 A2 7/2001

(Continued)

OTHER PUBLICATIONS

European Search Report dated Oct. 27, 2003 issued in a counterpart application, namely, Appln. No. 03004323.6.

(Continued)

*Primary Examiner*—Tuan C To
(74) *Attorney, Agent, or Firm*—The Farrell Law Firm, PC (57) ABSTRACT

Disclosed is a single or multi-route map matching apparatus in a system which provides a navigation service via a mobile communication terminal. The map matching apparatus comprises: an information center for calculating an optimum route to a destination inputted by a user based upon a present location of the mobile communication terminal, and generating a format of route data based upon the calculated optimum route; and an Intelligent Transportation System (ITS) terminal for detecting the present location of the mobile terminal to generate location data, processing the route data, performing map matching based upon the location data to determine whether the user travels on a given route or departs from the route, and performing road guidance based upon a result of the map matching.

5 Claims, 7 Drawing Sheets

U.S. PATENT DOCUMENTS

| | | | |
|---|---|---|---|
| 6,249,740 B1 | 6/2001 | Ito et al. | 701/200 |
| 6,295,503 B1 * | 9/2001 | Inoue et al. | 701/209 |
| 6,477,526 B2 * | 11/2002 | Hayashi et al. | 707/4 |
| 6,484,093 B1 * | 11/2002 | Ito et al. | 701/211 |
| 6,542,816 B1 * | 4/2003 | Ito et al. | 701/209 |
| 6,636,802 B1 * | 10/2003 | Nakano et al. | 701/208 |
| 6,662,105 B1 * | 12/2003 | Tada et al. | 701/209 |
| 6,829,558 B2 * | 12/2004 | Swope et al. | 702/151 |
| 6,950,746 B2 * | 9/2005 | Yano et al. | 701/210 |
| 7,071,843 B2 * | 7/2006 | Hashida et al. | 340/995.12 |
| 2001/0000455 A1 * | 4/2001 | Chao | 370/316 |
| 2001/0027375 A1 * | 10/2001 | Machida et al. | 701/209 |
| 2002/0040271 A1 * | 4/2002 | Park et al. | 701/209 |
| 2002/0077747 A1 * | 6/2002 | Hijikata | 701/209 |
| 2002/0146016 A1 * | 10/2002 | Liu et al. | 370/401 |
| 2002/0152018 A1 * | 10/2002 | Duckeck | 701/201 |
| 2002/0165663 A1 * | 11/2002 | Umezu et al. | 701/208 |
| 2002/0173905 A1 * | 11/2002 | Jin et al. | 701/207 |
| 2002/0173907 A1 * | 11/2002 | Ando | 701/209 |
| 2003/0078729 A1 * | 4/2003 | Ohdachi et al. | 701/211 |

FOREIGN PATENT DOCUMENTS

| | | |
|---|---|---|
| KR | 1020010045851 | 7/2001 |
| WO | WO 02/15148 | 2/2002 |

OTHER PUBLICATIONS

Korean Office Action (3 pgs.).

* cited by examiner

SINGLE OR MULTIPLE ROUTE MAP MATCHING APPARATUS FOR NAVIGATION SERVICE AND METHOD THEREOF

PRIORITY

This application claims priority to an application entitled "Single or Multiple Route Map Matching Apparatus for Navigation Service and Method Thereof" filed in the Korean Industrial Property Office on Feb. 27, 2002 and assigned Serial No. 2002-10692, the contents of which are hereby incorporated by reference herein.

BACKGROUND OF THE INVENTION

1. Field of the Invention

The present invention relates to a navigation system, and more particularly, to a map matching apparatus and method for a single route or multiple routes.

2. Description of the Related Art

A vehicle navigation service has a primary purpose of guiding a user to a desired destination via an in-vehicle mobile communication terminal and a navigation terminal functioning as a handsfree kit. In such a vehicle navigation service, a database (e.g., comprising a map) is needed to determine a present location of a vehicle or select a route. According to the current trend, the database is provided from a remote information center to the user rather than stored in the terminal. In a navigation system which provides the navigation service by merely referring to an optimum route obtained through calculation of data including traffic information in the information center, the user must re-access the information center to acquire a new route whenever he/she departs from a given route. In practice, it is possible that the user, by intention or mistake, does not ultimately travel along the provided optimum route. This will be treated as departure from the given route, and so the user must re-access the information center, thereby creating a burden on communication resources and the burden of the cost of the re-access.

SUMMARY OF THE INVENTION

The present invention has been made to solve the foregoing problems and it is therefore an object of the present invention to provide a map matching apparatus and method for a single route or multiple routes, which allow travel along an optimum route.

According to one aspect of the invention to obtain the above objects, a single or multiple route map matching apparatus, in a system which provides a navigation service via a mobile communication terminal, comprises: an information center for calculating an optimum route to a destination inputted by a user based upon a present location of the mobile communication terminal, and generating a format of route data based upon the calculated optimum route; and an Intelligent Transportation System (ITS) terminal for detecting the present location of the mobile terminal to generate location data, processing the route data, performing map matching based upon the location data to determine whether the user travels on a given route or departs from the route, and performing road guidance based upon a result of the map matching.

According to another aspect of the invention to obtain the above objects, a single or multi-route map matching method for performing a navigation service via a mobile communication terminal, the map matching method comprising:

(a) a first stage of transferring, by the mobile communication terminal, information about a destination inputted by a user into an information center;

(b) a second stage wherein the information center performs:
    a first step of determining a present location and searching a destination,
    a second step of performing route calculation by setting a gateway, generating multiple routes in respect to the set gateway and generating congested intersection information,
    a third step of generating an RGI (Route Guidance Information) format data by generating a basic RGI data, expanding a multi-route data, and adding the congested intersection information from the route calculation step to the RGI data, and
    a fourth step of transmitting the generated RGI format data into the mobile communication terminal;

(c) a third stage of transmitting, by the mobile communication terminal, the RGI data transmitted from the information center into the ITS terminal; and (d) a fourth stage wherein the ITS terminal performs:
    a first step of determining a present location of a user,
    a second step of searching for a matching road through RGI data patching and map matching to judge whether the user departs from a route,
    a third step of generating route guidance information as a result of the judging step, and
    a fourth step of transmitting the generated route guidance information into the mobile communication terminal, determining whether the user arrives at the destination, and if having not arrived, returning to the first step of present location determination, and wherein the mobile communication terminal displays the route guidance information received from the ITS terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The following detailed description will present a preferred embodiment of the invention in reference to the accompanying drawings, in which the same reference numerals are used throughout the different drawings to designate the same or similar components. Specific features such as detailed circuit components are disclosed in the following specification to help more general understanding of the invention, and it will be apparent to those skilled in the art that the invention can be made without these specific features. Furthermore, well-known functions or constructions will not be described in detail since they would unnecessarily obscure the understanding of the invention.

Figure 1:
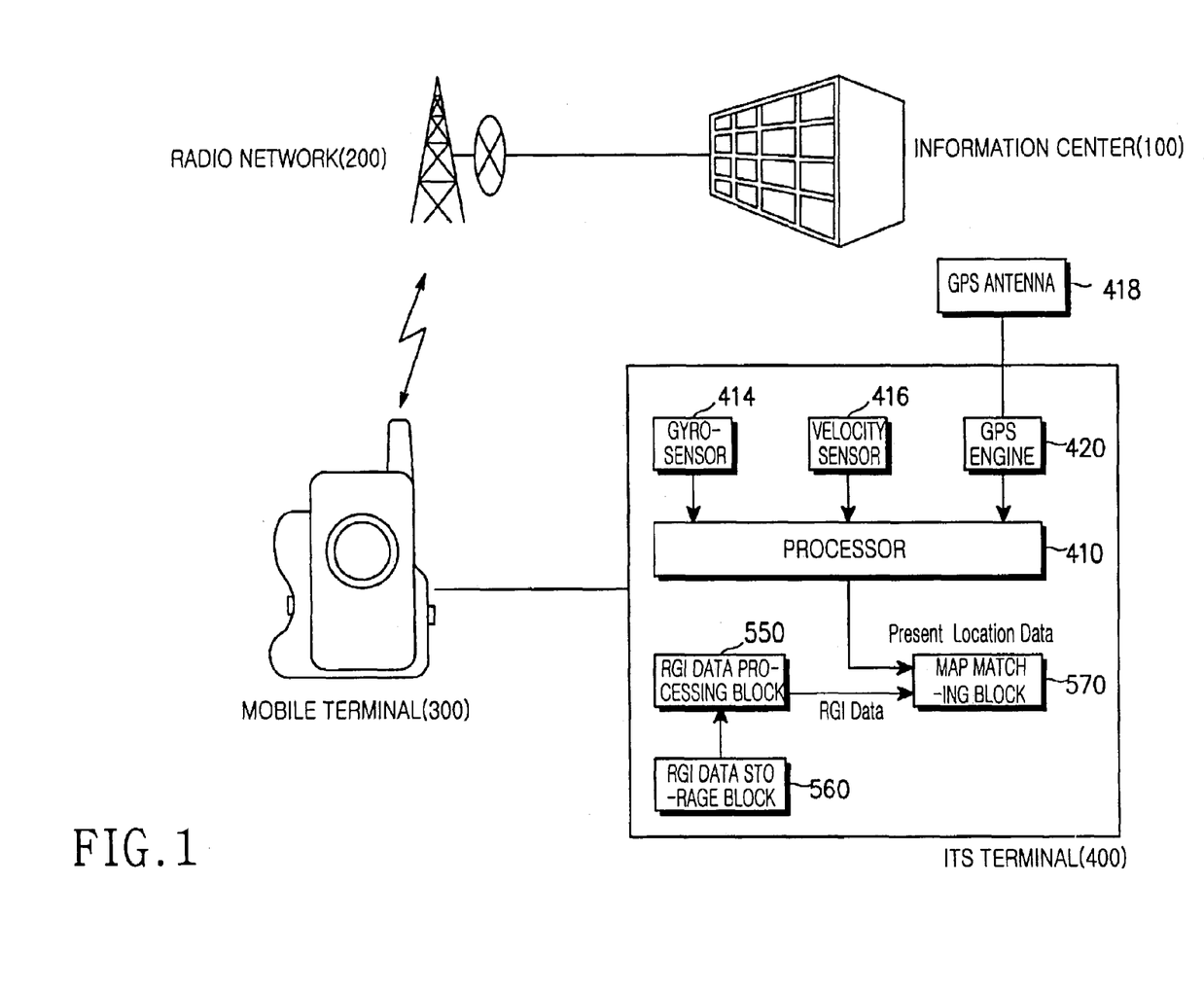
FIG. 1 illustrates a construction of a navigation system to which the invention is applied.

FIG. 1 illustrates a construction of a navigation system in accordance with the invention.

The navigation system includes an information center 100, a radio network 200, a mobile communication terminal 300 and an Intelligent Transportation System (ITS) terminal 400.

The information center 100 stores map data and realtime traffic information. At the request of the mobile communication terminal 300 for a navigation function, the information center 100 refers to the map data and the realtime traffic information to generate navigation information corresponding to the request, and provides the generated navigation information to the mobile communication terminal 300 via the radio network 200. For example, when the mobile communication terminal 300 requests guidance to an optimum route from a present location to a destination, the information center 100 refers to the map data and the realtime traffic information to generate guidance information for the optimum route from the present location to the destination.

The radio network 200 is a medium for information transmission between the information center 100 and the mobile communication terminal 300. Available examples of the radio network 200 may include a communication system based upon the currently popular Personal Communication System (PCS) and a digital cellular system based upon the IS-95A, -95B or -95C system. The radio network 200 may also utilize Code Division Multiple Access (CDMA) digital cellular systems such as the International Mobile Telecommunications 2000 (IMT-2000) and the Universal Mobile Telecommunication Systems (UMTS), which are being widely researched at present.

The mobile communication terminal 300 operates not only in a mode for providing a voice communication service but also in a navigation mode for supporting the navigation function. In the navigation mode, the mobile communication terminal 300 accesses the radio network 200 to receive various navigation information provided from the information center 100, and cooperates with the ITS terminal 400 to provide a user with the received navigation information.

In the navigation mode, the user can set the present location of a vehicle and a destination via the mobile communication terminal 300 in order to request the guidance of the optimum travel route from the information center 100. In this manner, the user may be provided with guidance regarding the optimum travel route from the information center 100 according to a typical navigation function. The user can make audio or text input to set the destination expressed as facility name, district category, administrative district name, town, zip code, street address, telephone number or longitude and latitude. In the navigation mode, the user may be also provided with traffic information (e.g., front area situation in traveling, downtown information, road information, highway information, information in respect to favorite places) from the information center 100. Further, the user can access the information center 100 via the mobile communication terminal 300 to search for nearby facilities, e.g., gas station, garage, bank, hospital, pharmacy and so on.

The mobile communication terminal 300 cooperates with the ITS terminal 400 to provide the received route guidance information to the user in a visual and/or audible manner. When visually provided to the user, the route guidance information can be shown on a display section of the mobile communication terminal 300 or via a dedicated display unit which is externally mounted and separately linked to the terminal 300. Also, when audibly provided, the route guidance information is sent to the outside via a speaker mounted on the mobile communication terminal 300 or the ITS terminal 400.

Describing a general construction of the ITS terminal 400, a Global Positioning System (GPS) engine 420 receives radio waves via an antenna 418 from a plurality of artificial satellites belonging to the GPS. A gyro-sensor 414 and a velocity sensor 416 constitute a sensor block, which detects the angle of rotation and the velocity of a vehicle, respectively, via the gyro-sensor 414 and the velocity sensor 416. An RGI data storage block 550 stores map data, and available examples thereof may include SRAM. A map matching block 570 accepts RGI data from the RGI data processing block 560 and present location data from a processor 410 to perform a map matching process.

Figure 2:
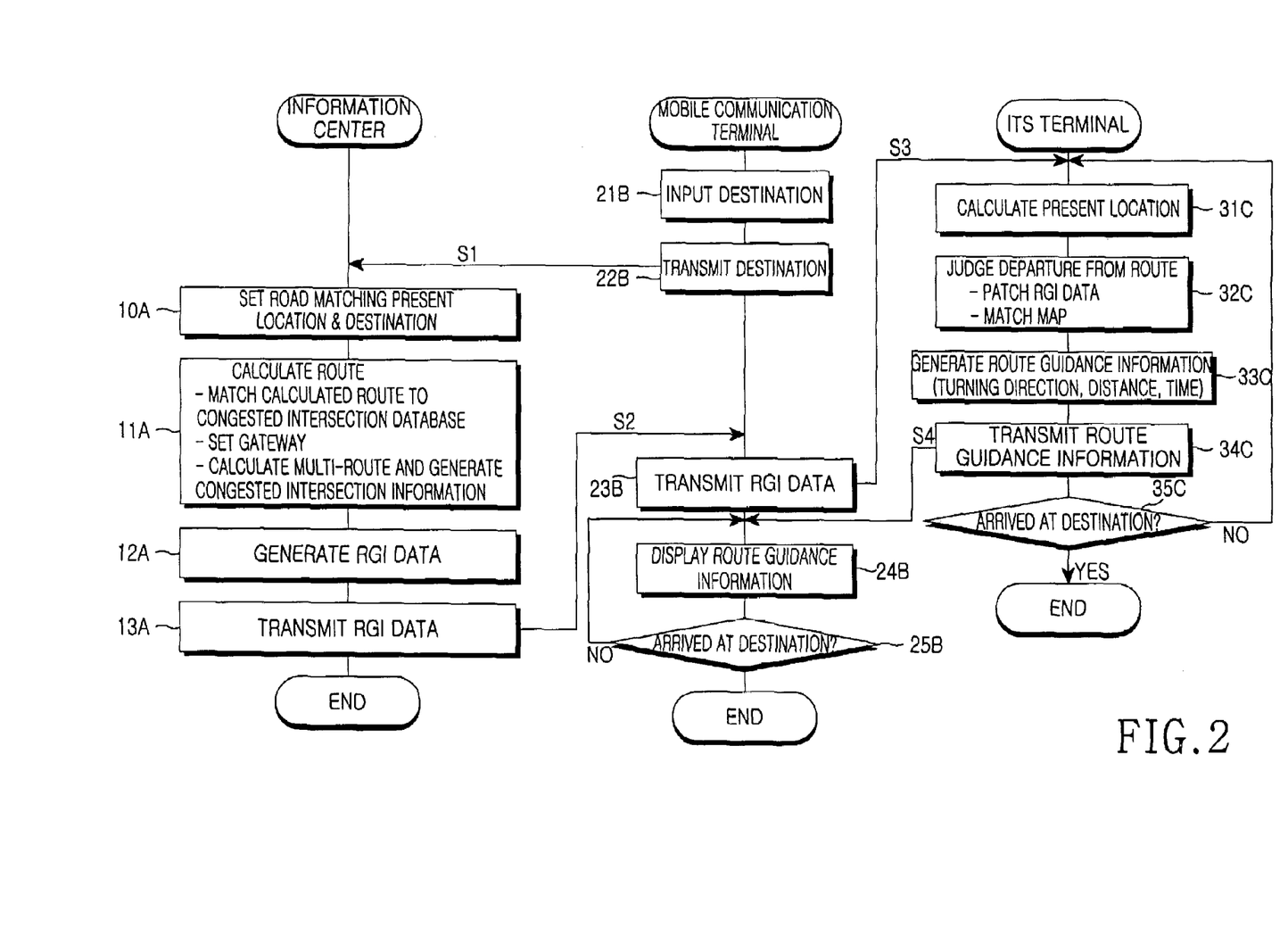
FIG. 2 is a flowchart of a map matching process on multiple routes for a vehicle navigation service according to a preferred embodiment of the invention.

FIG. 2 is a flowchart illustrating a map matching process for a vehicle navigation service according to a preferred embodiment of the invention.

The operation of the information center will be described as follows:

In step 10A, the information center determines the present location of a user, and searches for the destination of the user.

That is, the information center determines points on a map to which the present location and the destination of the user correspond. The present location is searched for based upon present location data (input by user at mobile terminal 300, or transmitted from GPS engine 420 through mobile terminal 300) and heading information of a vehicle transmitted from the ITS terminal, in which the information center can calculate a route while giving priority consideration to the direction of advancement of the vehicle or without consideration to the direction of the vehicle. Based upon a name or other destination type data inputted by the user, the information center searches for the location of the corresponding name and a road matching thereto in a facility information database of the information center in order to find the destination. A nearby road is matched if the correspondent facility is distant from roads in the database.

In step 11A, the information center performs route calculation by setting gateways (e.g. specific intersections), generating multiple routes with respect to the set gateways, and generating congested route and/or intersection information, in which the traffic information is reflected.

The information center matches the found present location and the destination road to links on route calculation data. The information center performs route searching from the present location to the destination road. The route search is performed to find a route between the present location and the destination consuming the lowest value based upon a value ascribed to each of the links in the route calculation data. With respect to an area where traffic information is provided, the information center calculates the value thereof based upon the received traffic information rather than the route calculation data. The route search reflects the difficulty of traversing each intersection, for example. Also, the route search reflects a weighting of road classification (highway versus local roadway, for example), intersection and turning type. For each candidate route, the route search repeats the steps of storing the value between roads, which have been found thus far, and a next road connecting the route, and calculates the value of the connected next road based upon the road consuming the lowest value among those which have been calculated so far. The information center can search all routes from the present location to the destination by using the route search.

In the gateway setting, the information center searches a congested intersection database to select n number of points about the congested intersections where the user may readily depart from the given route or sections where traffic flow changes frequently, potentially causing the user to intentionally depart from the given route. The gateway sections are restricted within a range of a % with respect to the whole number of routes since they are also limited by the size and capacity of the entire RGI data. In the route search, if sections of the route pass by those intersections stored in the congested intersection database and are within the range of α % with respect to the estimated whole number of routes, they are registered as gateways, and the congested intersections are separately stored. Separate storage of the congested intersections adds information for partial route extraction and rough maps around the congested intersections to the RGI data as separate data which can be displayed on the mobile communication terminal. Each of the intersections from the RGI data having the rough route data is further provided with an offset for showing whether the intersection has a map of a correspondent congested intersection and allowing access to the data.

Further, the information center must have a congested intersection database or a database storing information of intersections which are congested or have a large variation in traffic flow. The congested intersection database contains nation-wide intersection names, road classifications, link information (e.g., highway or route numbers, attributes, etc.), point information, etc. based upon regions. A route calculation utilizes the congested intersection database.

The congested intersection database contains information which is usable in matching congested intersections in calculation and configuration information of each congested intersection (e.g. line configuration of the intersections).

Upon completion of the route search, the information center extracts partial routes generated as end gateways respectively from the present location and the destination, and stores the extracted partial routes. This allows the multiple routes to be so devised that upper and lower sub-routes are stored with both ends functioning as the end gateways.

Figure 3:
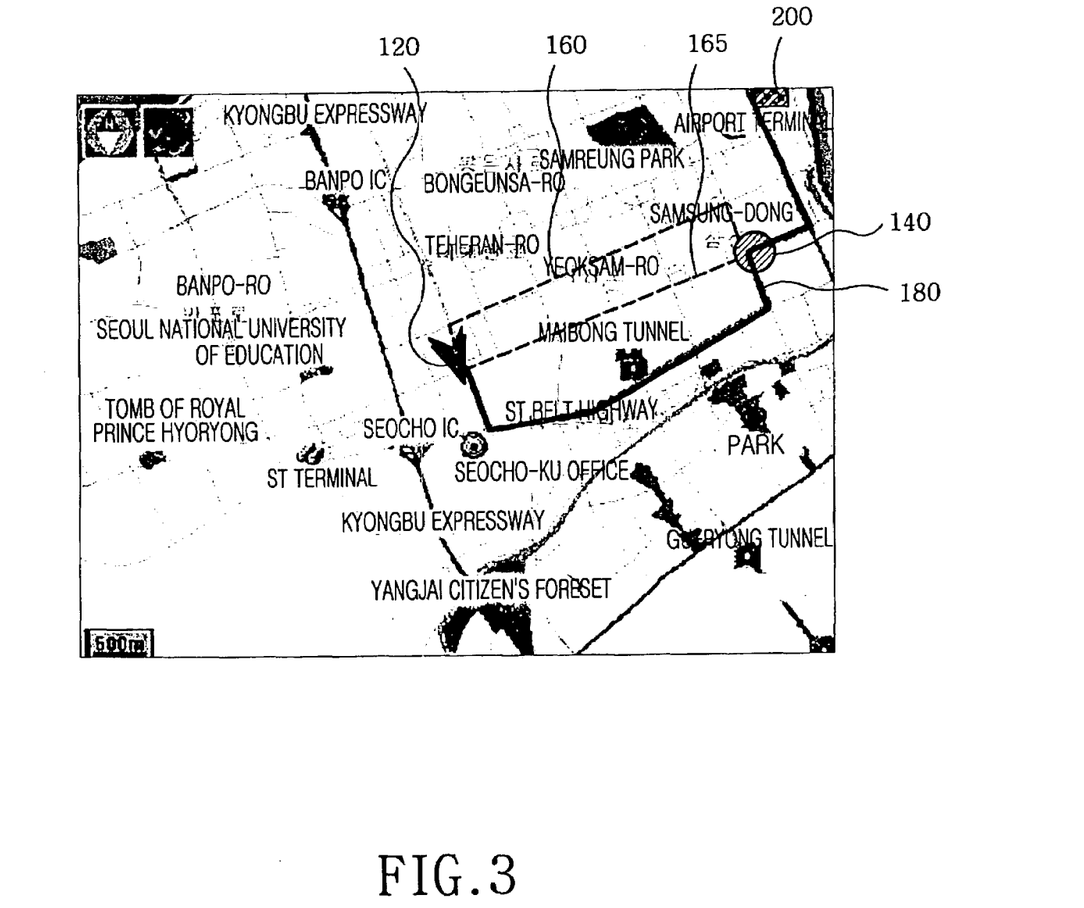
FIG. 3 is a map illustrating an example of multiple routes devised according to the present invention.

FIG. 3 is a map illustrating multiple routes devised according to the invention.

The reference number 120 designates a present position of a mobile body (e.g. vehicle), 140 designates a gateway, 160 designates a first sub-route, 165 designates a second sub-route. The routes 160 and 165 are set as sub-routes rather than an optimum route since they are both congested owing to a large volume of traffic. The reference number 180 designates the optimum route, and 200 designates a destination.

Route search can select not only a road on the optimum route but also other roads connected to the optimum route. Although excluded from the optimum route, those roads set as gateways can be maintained with a certain degree of connectivity.

Referring to FIG. 2 again, the information center generates the RGI format data using the optimum route in step 12A.

To be specific, the information center primarily generates the RGI data, expands multiple route RGI data, and then adds the congested intersection information obtained from the route calculation to the RGI data.

The multiple route and congested intersection data are utilized to minimize drawbacks of a conventional single route (e.g., upon departure from the given route, the user must re-access the information center to download a new route again, thereby incurring additional costs for re-access and related service) while enhancing expansibility and flexibility of the RGI data.

The information center generates RGI data from the multiple routes passing by a gateway via the sub-routes from the gateway on the optimum route, and stores offsets into RGI items corresponding to the gateway. When several sub-routes are associated with one gateway, each of the sub-routes stores an offset of the next sub-route toward the RGI so that following of the offsets allows access to several sub-routes. This constitutes an annular offset structure in which continuous following of the offsets returns to the original optimum route.

The information center generates an offset between the last portion of each sub-route of the gateway and an overlapped portion of the optimum route in the same manner as the offset in the gateway.

In step 13A, the information center transmits the generated RGI format data into the mobile communication terminal (S2).

Hereinafter, the operation of the mobile communication terminal will be described.

In step 21B, the user inputs his/her destination into the mobile communication terminal. Although this embodiment assumes that the destination is inputted into the mobile communication terminal, the destination can be also inputted into the ITS terminal, which transmits the destination into the mobile communication terminal.

In step 22B, the inputted destination information is transmitted into the information center (S1).

In step 23B, the RGI data transmitted from the information center (step S2) are transmitted into the ITS terminal (Step S3).

In step 24B and 25B, the mobile terminal receives route guidance information from the ITS terminal (S4) and displays the route guidance information until the vehicle arrives at the destination. The ITS terminal provides guidance of a next intersection, distance or time information up to the destination, etc. in a turn-by-turn mode.

Hereinafter the operation of the ITS terminal will be described as follows:

In step 31C, the ITS terminal determines the present location of the user. The present location of the user is calculated based upon information obtained from various location information sensors (e.g., GPS, gyro-sensor and acceleration sensor).

In step 32C, the ITS terminal searches for a matching road to judge whether the vehicle departs from the route. The ITS terminal searches for a matching road in the RGI data (i.e., a data format for road and route guidance) for the present location of the user. If any matching road is found, it is judged that the vehicle has departed from the route.

Hereinafter the RGI data patch will be described in more detail as follows:

Map information in conventional navigation data is constituted of a certain amount of road data. For the purpose of accessing all of the road data corresponding to each area, the corresponding area is searched for in an area management table so that raw data can be used, in which the area and the road data each are unique. The road data are searched to match the location of the user on the road, in which the road data are generally searched within a specific area about the present location and in respect to each zone. As the user travels changing the present location area, the area of search list is updated.

The navigation system used in the embodiment of the invention is inexpensive since it does not internally install map information. The information center provides the navigation system with the RGI data in a simple form used in map matching and route guidance for the user traveling to the destination, and thus the navigation system realizes a basic function of navigation.

The RGI data are sequentially made based upon specific zones which are the areas in the route between the present location and the destination. The route can repeatedly enter and exit a specific district in a zigzag manner. The user may discuss a policy of effective patching instead of patching all the data every time in data patching, e.g., he/she may drive in a different manner where P turn is needed at a boundary of districts. That is, the same area can be irregularly repeated. According to an aspect of this system, through the entry point, the user can enter an intermediate point of the RGI data and then be guided by the system rather than traveling from the starting point of the RGI data. Also, the user may depart from the route according to the setting of the user even though he/she is traveling under the normal route guidance after entry, in which case the user may re-enter the original route through entry point guidance. Therefore, it is necessary to patch the data in a manner capable of coping with the above situations.

1) If the user fails to enter a given route, the RGI data are searched for in the initial portion until an area identical with the present location is found. If an area other than an adjacent area (e.g., within ±1 of the reference index of the present location) is found, the search is stopped.
2) If an area corresponding to the present location varies from the determined route, a data patch algorithm is processed. The patch algorithm is used to focus on a smaller section of the entire route for management, from the current location of the vehicle through adjacent areas of a predetermined size and location ("patches") through which the route runs.
3) After the initial data patch is determined, an index of the existing area list is updated on the basis of the present location area.
4) An area list of new RGI data is started from an area which was last searched in the previously searched RGI data.
5) After searching the area corresponding to the present area, search and management are performed only to adjacent areas (within ±1 of the reference index of the present location).

Next, the map matching will be described in detail as follows:

The map matching calculates whether the user travels on a corresponding road on a single route, and the actual location of the user in a multiple route section.

1) The present location road of the user is searched for using road data in the final patched area list (within ±1 of the reference index of the present location). The matching adopts direction and position values of the vehicle together with a map matching algorithm through road data matching. (The map matching algorithm will not be discussed herein.)
2) In the multiple routes, an area list of each of the routes is separately managed, and used in map matching when the user approaches one of the multiple routes.

Figure 4A:
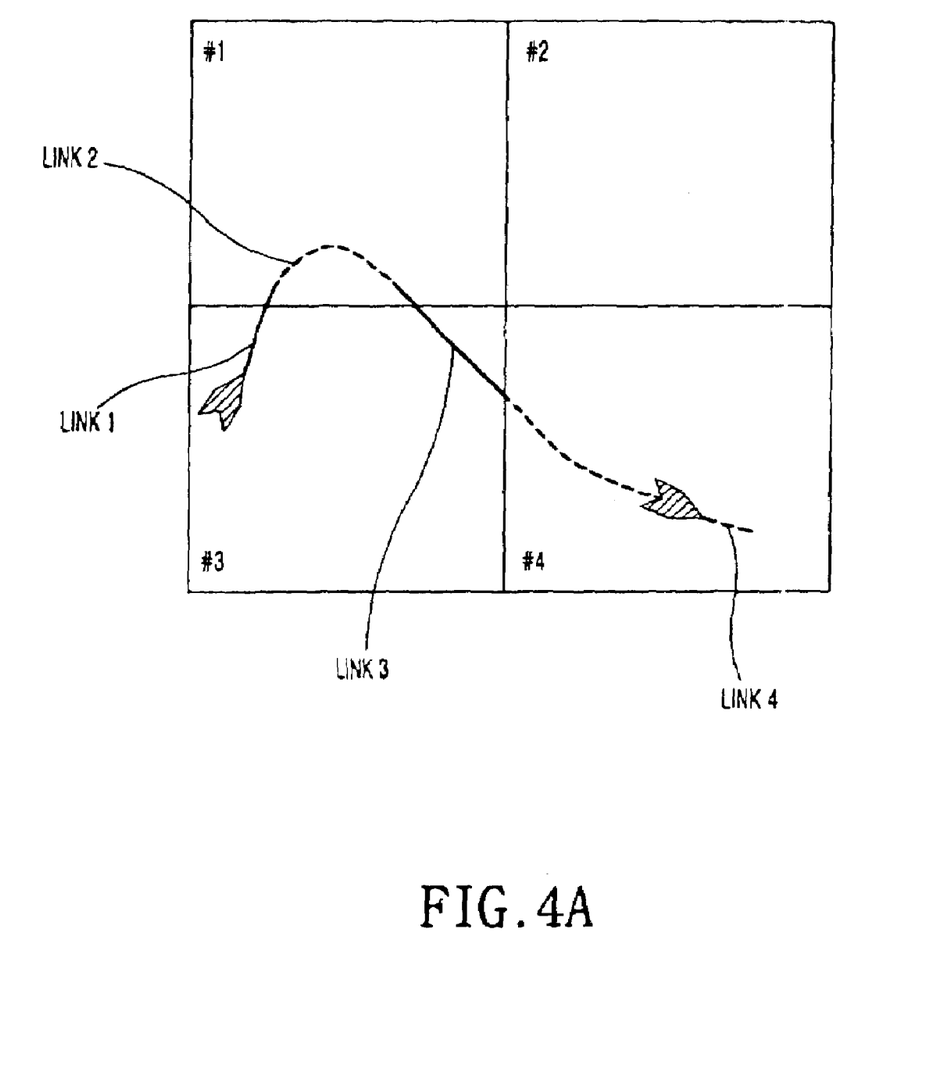
FIG. 4A is a diagram illustrating an example of a construction of RGI data.

FIG. 4A is an example diagram illustrating a construction of RGI data in detail.

Numbers shown in FIG. 4A are used for indicating areas (hereinafter will be referred to as id), for the sake of convenience. As shown in FIG. 4A, there are four ids, and a vehicle moves through three ids among the four ids. A solid line in id 3 designates link 1 and it indicates a locus which the vehicle moves in id 3. A dotted line in id 1 designates link 2 and it indicates a locus which the vehicle moves in id 1. A dotted line in id 4 designates link 4 and it indicates a locus which the vehicle moves in id 4. Each link is indicated with a solid line or dotted line, solely for clarity in FIG. 4A.

According to FIG. 4A, the vehicle starts from id 3 and travels to id 1, id 3, and id 4. Therefore, the RGI data generated includes the traveled areas as sub-data, i.e., four sub-data items in this case. Each sub-data item is comprised of a pair of id information and link information. In FIG. 4A, the four sub-data are comprised of (id 3, link 1), (id 1, link 2), (id 3, link 3), (id 4, link 4) according to sequential traveling of the vehicle, wherein the link information includes generic characters of a road such as a highway, a fan shape, or a crossroads.

When the vehicle moves to another area, ITS terminal 400 performs an operation for determining RGI data and the operation corresponds to step 32c in FIG. 2.

Figure 4B:
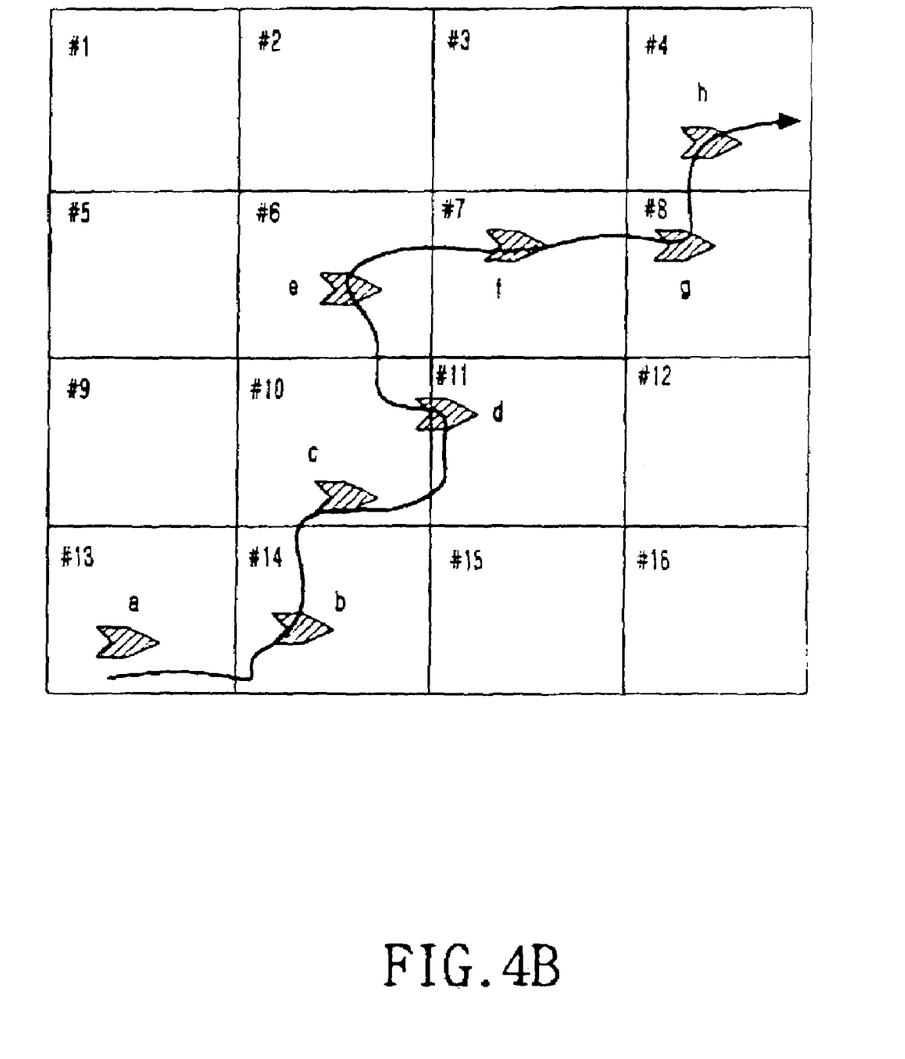
FIG. 4B is a diagram illustrating map matching of the invention.

FIG. 4B is a diagram illustrating the map matching of the invention. The numbers 1 to 16 in FIG. 4B indicate ids and the alphabet a to h indicate vehicle position. If the vehicle is located in id 13, ids that are searched to include RGI data and that correspond to within the limits of peripheral index ±1 from an area where the vehicle is currently located are found to be ids 13, 14 and 10. Thereafter, if the vehicle moves to b of id 14, RGI data is searched for within the limits of peripheral index ±1. Thus, the ids are "patched" as the vehicle moves along the route. If the vehicle is located in b of id 14, RGI data is searched for in id 11 which is a new id with respect to the previously searched ids, because RGI data is already searched in three ids, i.e., ids 13, 14, and 10 corresponding to peripheral index ±1 centering on a of id 13.

The following description is another example illustrating map matching when the vehicle travels not from id 13 but from id 17, which is off the route. Starting from id 17 (which is an area directly below id 13, even though not shown in FIG. 4B), whole RGI areas will be searched (in the order of 13, 14, 10, 11, 10', 6, 7, 8 and 4 in the drawing) since the current location does not correspond to one of the id areas. In this case, id 13 and id 14 are added to an area list, and when the vehicle moves into id 13, the search will continue with id 10 as in the search above.

When the vehicle travels along a through h changing its location with respect to the determined route, the following operations will be performed: Hereinafter a backup area is considered as a previously patched id area in the foregoing phase and will be updated with indices (\*, \*) only. A reference area means an area where the vehicle is located, that is, having an index (0, 0). A new area is newly added to the area list, after being searched from the area of current location.

The RGI data are generated in the information center, as a format established for performing map matching and route guidance in the ITS terminal. The RGI data may not include other surrounding road information since the RGI data are applied to the calculated route between the present position of the vehicle and the destination. Therefore, the RGI data are not generated for all ids, but generated in sequence according to an advancing direction of the calculated route (e.g., in the order of 13, 14, 10, 11, 10', 6, 7, 8 and 4), and contain links and node information.

Traveling of the vehicle generates new location values, and locations of the vehicle are determined based upon the location values in the RGI data. That is, the RGI data are used whenever new location data are generated. Location n in the nth area indicates the position in the RGI data in the nth area.

When a vehicle moves into a new id area, RGI data is searched for in nearby areas (within peripheral index +1) that have not yet been searched.

The reference area means an area where the vehicle is currently located. The previously searched areas have their indices changed to the backup areas on the basis of the present location of the vehicle. The previously searched areas are treated as backup areas, in which the indices are changed based upon the present location of the vehicle. The RGI data in use for calculation include only those data such as links, nodes and so on belonging to a range of indices (±1, ±1) of where the vehicle is currently located after data patching is over, and those data belonging to each of the areas are filtered again through an additional clipping process.

The following example corresponds to FIG. 4B, and illustrates how the areas are patched together to give RGI data based on the present location of the vehicle as it moves to another area). As noted above, backup areas are those areas selected prior to an area where the vehicle is currently located, a reference area is where the vehicle is currently located and a new area is an area newly added based upon it including RGI data and being within index ±1 of the present area. The parameter "n" illustrates how many areas have been searched and included.

Location a: id 13, n=1, in which the vehicle travels along a route in the order of 13, 14 and 10.
    reference area: 13 (0, 0)
    new area: 13 (0, 0), 14 (1, 0) and 10 (1, 1)
Location b: id 14, n=4, in which the vehicle travels along a route in the order of (13, 14 and 10) (all previously searched, as designated by the parenthesis), 11 and 10'.
    backup area: 13 (−1, 0) and 10 (0, 1)
    reference area: 14 (0, 0)
    new area: 11 (1, 1) and 10' (0, 1)
c: id 10, n=6, in which the vehicle travels along a route in the order of (13, 14, 10, 11 and 10'), 6 and 7.
    backup area: 13 (−1, −1), 14 (−1, 0) and 11 (1, 0)
    reference area: 10 (0, 0) and 10' (0, 0)
    new area: 6 (1, 0) and 7 (1, 1)
d: id 11, n=8, in which the vehicle travels along a route in the order of (13, 14, 10, 11, 10', 6 and 7) and 8.
    backup area: 13 (−2, −1), 14 (−1, −1), 10 (−1, 0), 10' (−1, 0), 6 (−1, 1) and 7 (
    reference area: 11 (0, 0)
    new area: 8 (1, 1)
e: id 6, n=9, in which the vehicle travels along a route in the order of (13, 14, 10, 11, 10', 6, 7 and 8).
    backup area: 13 (−1, −2), 14 (0, −2), 10 (0, −1), 10' (0, −1) and 7 (1, 0)
    reference area: 6 (0, 0)
    new area: (none)
f: id 7, n=9 in which the vehicle travels along a route in the order of (13, 14, 10, 11, 10', 6, 7 and 8) and 4.
    backup area: 13 (−2, −2), 14 (−1, −2), 10 (−1, −1), 10' (−1, −1), 6 (−1, 0) and 8 (1, 0)
    reference area: 7 (0, 0)
    new area: 4 (1, 1)
g: id 8
    backup area: 13 (−3, −2), 14 (−2, −2), 10 (−2, −1), 10' (−2, −1), 6 (−2, 0) and 7 (−1, 0)
    reference area: 8 (0, 0)
    new area: (none)
h: id 4
    backup area: 13 (−3, −3), 14 (−2, −3), 10 (−2, −2), 10' (−2, −2), 6 (−2, −1), 7 (−1, −1) and 8 (0, −1)
    reference area: 4 (0, 0)
    new area: (none)

Figure 5:
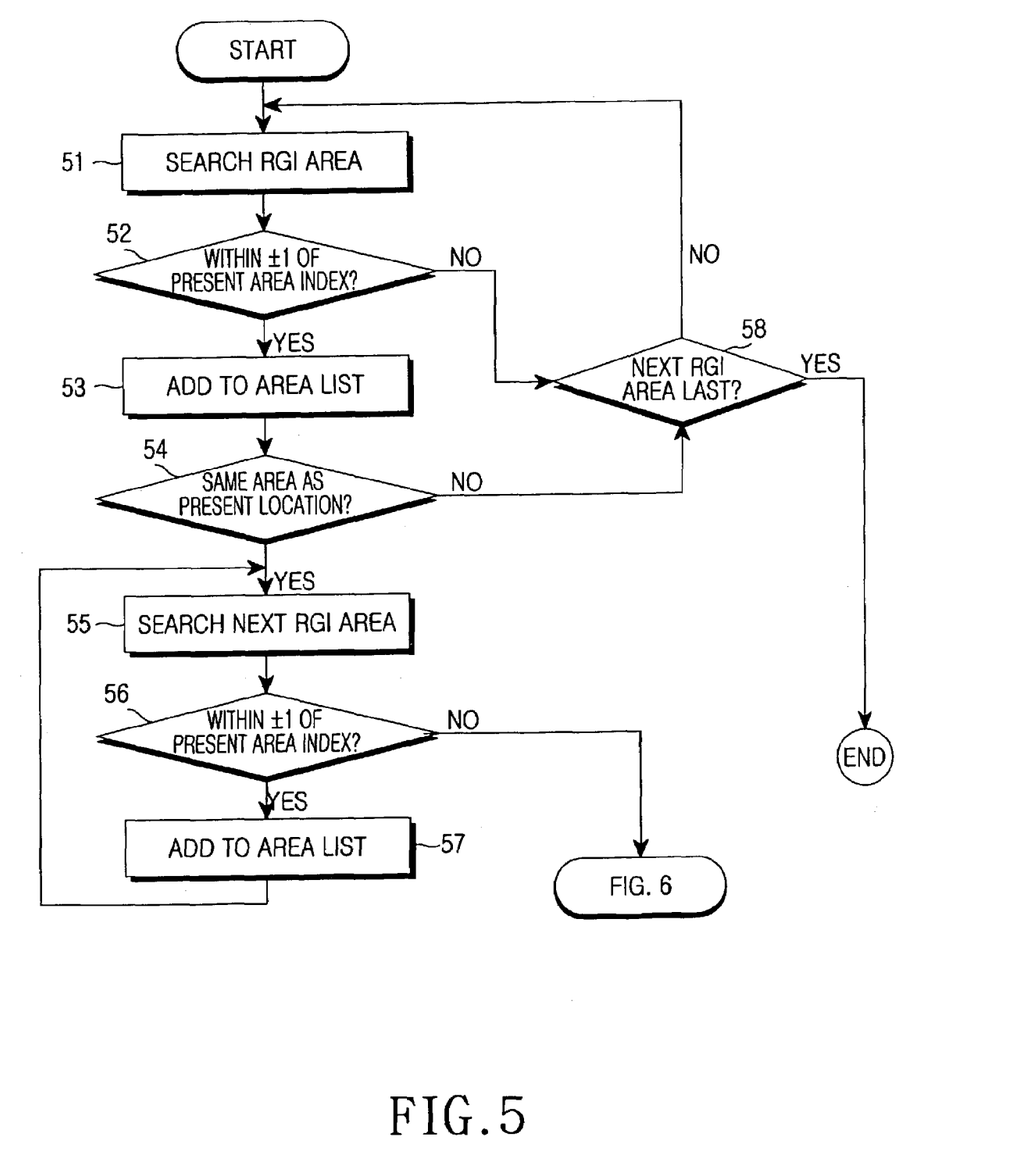
FIG. 5 is a flowchart illustrating an operational process for patching initial RGI data during map matching of an ITS terminal according to the preferred embodiment of the invention.

FIG. 5 is a flowchart illustrating an operational process for patching initial RGI data during map matching of the ITS terminal in FIG. 2 (step 32C).

When the vehicle moves as shown in FIG. 4B, the ITS terminal searches for an RGI area corresponding to id 13 in step 51. In step 51, the ITS terminal judges whether the index is within ±1 of the reference index of the present location. Since the vehicle is in the reference area 13 (0, 0), the index is within ±1 of the reference index of the present location. Therefore, in step 53, the RGI area corresponding to id 13 is added to the area list. In step 54, it is judged whether the RGI area corresponding to id 13 is identical with the present location. If identical, an RGI area corresponding to id 14 is searched in step 55. Judging whether the indices are within ±1 of the reference index of the present location in step 56, they are in a reference area 13 (0, 0) and a new area 14 (1, 0) and thus within ±1 of the reference index of the present location. Therefore, in step 57, an RGI area corresponding to id 14 is added to the area list. Returning to step 55, a next RGI area, i.e., an RGI area corresponding to id 10 is searched. Judging whether the indices are within ±1 of the reference index of the present location in step 56, they are in a reference area 13 (0, 0), new areas 14 (1, 0) and 10 (1, 1) and thus within ±1 of the reference index of the present location. Therefore, in step 57, an RGI area corresponding to id 10 is added to the area list. In FIG. 4B, the first data patch is about 13, 14 and 10, the process proceeds no more.

If it is judged that the area is not identical with the present location in step 54, step 58 judges whether a next RGI area is the last RGI area, i.e., includes the destination. If not, the process returns to step 51 in order to search a next RGI area. In FIG. 4B, the next RGI area is 14. If the next RGI area is also different from the last RGI area, the above process is repeated. In the worst situation, the process is repeated to search until the last RGI area or id 4.

Thus, the vehicle only selects and processes RGI data for areas based on the current location of the vehicle and its immediate surroundings for the initial route. Location of the vehicle with respect to the RGI data under consideration is used to perform route guidance via map matching. By using a focused amount of RGI data for route guidance and map matching, processing loads are reduced and speed is increased. If all received RGI data were to be searched and used in map matching, a large processing load is incurred.

Figure 6:
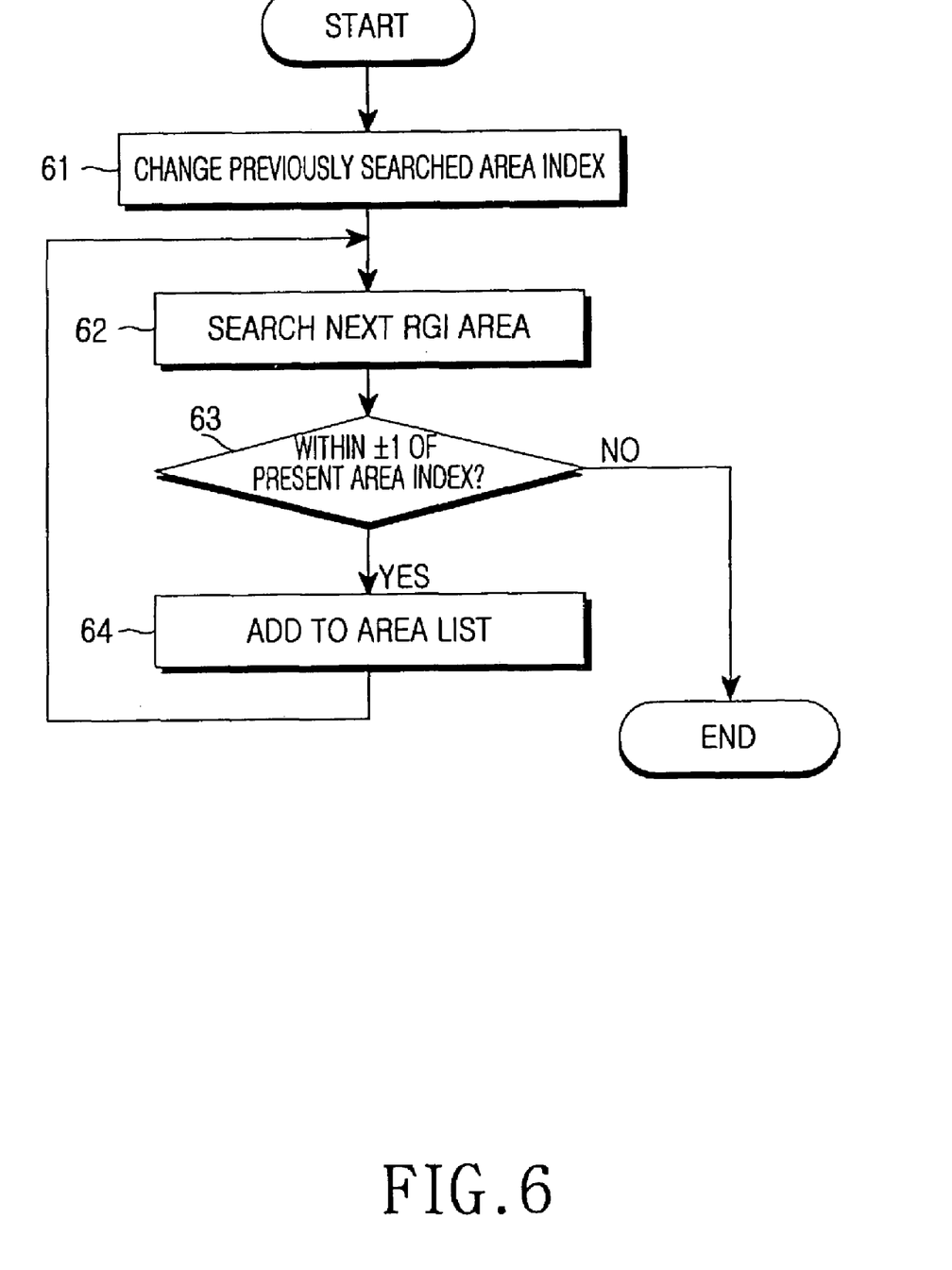
FIG. 6 is a flowchart illustrating an operational process for patching subsequent RGI data during map matching of the ITS terminal according to the preferred embodiment of the invention.

FIG. 6 is a flowchart illustrating an operational process for patching subsequent RGI data during map matching of the ITS terminal shown in FIG. 2.

In step 61, indices, of the existing searched areas having ids 13, 14 and 10 will be changed, in which backup areas are 13 (−1, 0) and 14 (0, 0), 10(0, +1).

In step 62, the ITS terminal searches a next RGI area.

In step 63, the ITS terminal judges whether the corresponding RGI area is within ±1 of the reference index of the present location. If the index of the corresponding RGI area is within ±1, the ITS terminal adds the corresponding RGI area to the area list in step 64, and then returns to step 62. RGI areas are added to the area list in this manner owing to variation in reference.

In the meantime, the process terminates if the area is not within ±1 of the reference index of the present location.

Referring to FIG. 2 again, the route is guided in step 33C.

The ITS terminal generates information about next route guidance from matched road information and RGI data. And, the ITS terminal performs map matching by information of a link and a node in the selected RGI area to calculate a road where the vehicle is currently located. That is, ITS terminal generates turning information such as lateral turning and distance left to a next route guidance point.

According to the present invention as set forth above, the map matching and route guidance data are obtained using the multi-route and detailed intersection information added to the specific format of RGI data so that re-accessing the information center can be minimized after departure of a user from a route by intention or mistake, as well as indicating beforehand, the detailed intersection information overcoming drawbacks that this system does not install a map so as to minimize telephone charges required for accessing the information center. This also allows a system body to efficiently perform the navigation service even without a map database. The system body can optimize a policy of treating the RGI data so as to reduce system load while enhancing performance.

Although the preferred embodiments of the present invention have been disclosed for illustrative purposes, those skilled in the art will appreciate that various modifications, additions and substitutions can be made without departing from the scope and spirit of the invention. It is intended that the scope of the present invention is not be restricted to the foregoing embodiment of the invention but shall be defined by the following claims and equivalents thereof.

What is claimed is:

1. A navigation system which provides a navigation service via a mobile communication terminal, the navigation system comprising:
    an information center including means for
    calculating an optimum route to a destination inputted by a user based upon a present location of the mobile communication terminal, and
    generating route data based upon the calculated optimum route, wherein the route data is generated with respect to the optimum route and sub-routes, the sub-routes connecting two arbitrary locations, the two arbitrary locations selected from a present location of the mobile terminal and at least one gateway, wherein the gateway is set as a point in a specific range of calculation between the present location and the destination; and
    an Intelligent Transportation System (ITS) terminal including means for detecting the present location of the mobile communication terminal to generate location data,
    processing the route data, performing map matching based upon the location data to determine whether the user travels on a given route or departs from the route, and
    performing road guidance based upon a result of the map matching.

2. The navigation system in accordance with claim 1, wherein the route data comprises:
    congested intersection information managed by the information center based upon a standard which considers at least one route feature selected from a group including interchange, junction, a plurality of crossing points, overpass, and underpass.

3. The navigation system in accordance with claim 2, wherein the route data including the congested intersection information further comprises:
    a first portion which includes the number of the sub-routes, a flag indicating whether the sub-routes exist in a specific range of the congested intersection, a first offset indicating a corresponding data position and a second offset regarding a gateway where the sub-routes terminate; and
    a second portion which includes information of road configuration, road classification, road number and name of intersection with respect to all of the intersections.

4. A navigation system which provides a navigation service via a mobile communication terminal, the navigation system comprising:
    an information center including means for
        calculating an optimum route to a destination inputted by a user based upon a present location of the mobile communication terminal, and
        generating route data based upon the calculated optimum route, wherein the route data is generated with respect to the optimum route and sub-routes, the sub-routes connecting two arbitrary locations, the two arbitrary locations selected from a present location of the mobile terminal, at least one gateway, or the destination,
    wherein the route data further comprises:
        a first portion which includes the number of the sub-routes, a flag indicating whether the sub-routes exist in a specific range, a first offset indicating a corresponding data position and a second offset regarding a gateway where the sub-routes tenninate; and
        a second portion which includes the number of the-sub-routes, size of the whole data, and an offset with respect to each of the routes; and an Intelligent Transportation System (ITS) terminal including means for detecting the present location of the mobile terminal to generate location data, processing the route data, performing map matching based upon the location data to determine whether the user travels on a given route or departs from the route, and performing road guidance based upon a result of the map matching.

5. A navigation system which provides a navigation service via a mobile communication terminal, the navigation system comprising:
    an information center including means for
        calculating an optimum route to a destination inputted by a user based upon a present location of the mobile communication terminal, and
        generating route data based upon the calculated optimum route, wherein the route data is generated with respect to the optimum route and sub-routes, the sub-routes connecting two arbitrary locations, the two arbitrary locations selected from a present location of the mobile terminal, a gateway, or the destination,
        wherein a distance to the gateway is defined about a predetermined percentage of total routes to the destination; and
    an Intelligent Transportation System (ITS) terminal including means for
        detecting the present location of the mobile terminal to generate location data,
        processing the route data, performing map matching based upon the location data to determine whether the user travels on a given route or departs from the route, and
        performing road guidance based upon a result of the map matching.

* * * * *